Jan. 18, 1944.   G. F. HAUF ET AL   2,339,332
PORTABLE IRRIGATION PIPE JOINT
Filed Feb. 6, 1943   2 Sheets-Sheet 2
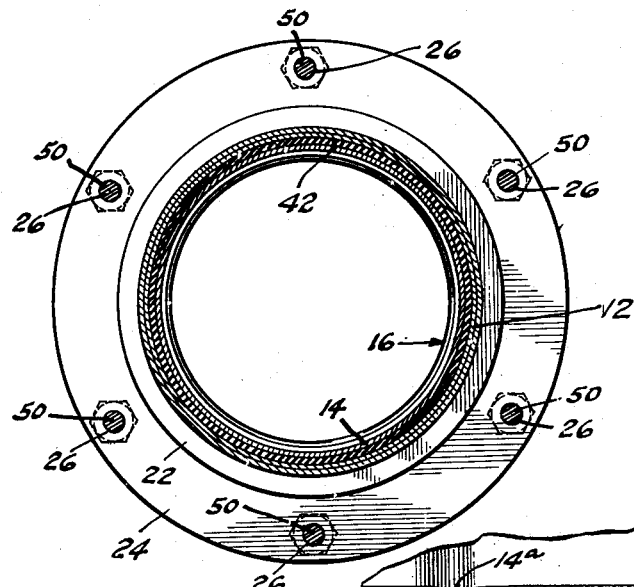
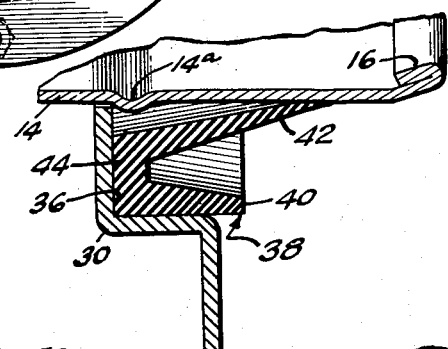
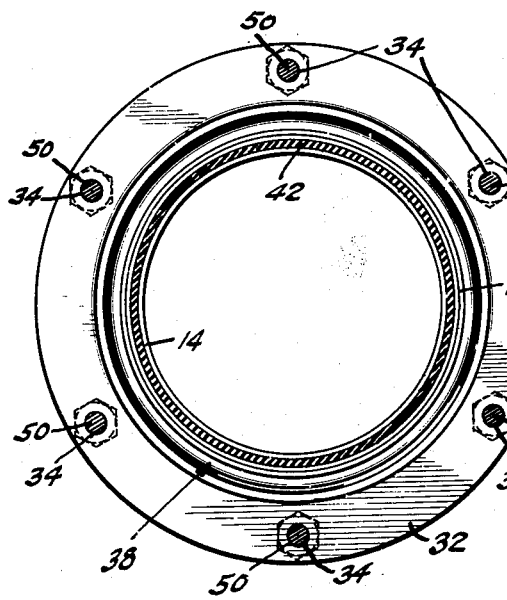
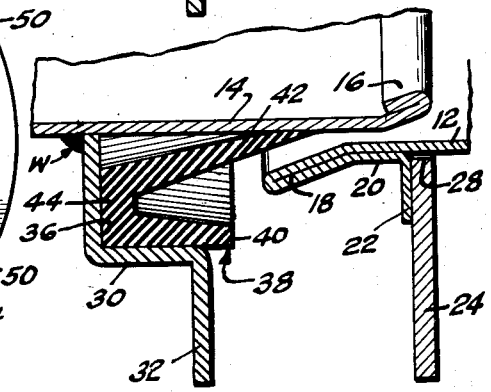
INVENTORS.
GEORGE F. HAUF
ERNEST PRETORIUS
BY Harry H. Hitzeman
ATTORNEY.

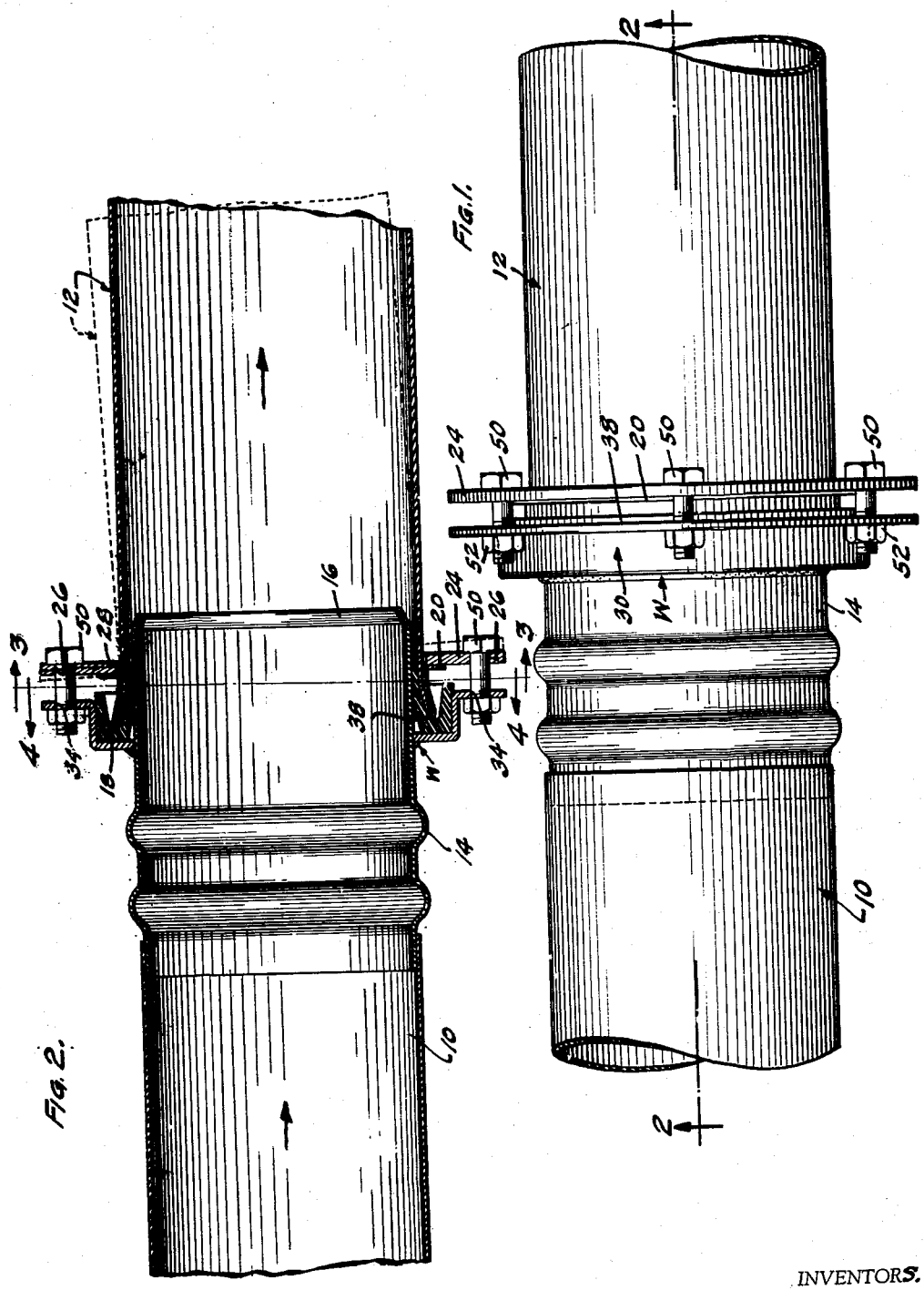

Patented Jan. 18, 1944

2,339,332

UNITED STATES PATENT OFFICE 2,339,332

PORTABLE IRRIGATION PIPE JOINT

George F. Hauf, River Forest, and Ernest Pretorius, Chicago, Ill., assignors to Chicago Metal Mfg. Co., Chicago, Ill., a corporation of Illinois Application February 6, 1943, Serial No. 475,032

5 Claims. (Cl. 285—134)

Our invention relates to improvements in flexible pipe joints or couplings, and more particularly to a flexible pipe joint or coupling adapted to connect together lengths of irrigation piping which are placed at the suction end of the piping lay-out.

Piping for irrigation purposes is ordinarily constructed of sheet metal such as galvanized iron, in suitable lengths having coupler elements at both ends, usually a male coupling member at one end and a female coupling member at the other, so that they may be telescopically joined and fastened together in operative relationship. The coupling members also usually permit angular misalignment of the piping to follow the surface terrain of the land to be irrigated and the place from which the water is to be obtained. Since such piping is frequently disassembled and moved to new locations from time to time, it followslows that the coupling means must be easily disassembled, yet rugged and durable so that the same will not become easily broken or out of order.

Piping of the type which is usually connected from the pump to the field to be irrigated is shown and described in U. S. Patent No. 2,278,074, issued to George F. Hauf, one of the present applicants herein.

This particular application is directed to the suction end of the irrigation system and relates directly to the connections between the separable pipes which extend from the source of water, such as a lake or irrigation ditch, to the motor driven pump which forces the water outwardly through the irrigation piping to the field to be irrigated.

The principal object of the present invention is to provide an improved fluid-tight coupling for the suction piping of an irrigation piping system.

A further object of the present invention is to provide an improved coupling of the type described which is easily assembled or disassembled, and yet which in operation is absolutely fluid-proof for the purpose for which it is required.

A further object of the present invention is to provide prefabricated male and female connector members associated with the opposite ends of piping of the type described, so constructed that the piping may be assembled together by the simple expedient of fastening a plurality of bolts.

A further object of the invention is to provide in combination with the connector members described, an improved type of flexible gasket or collar which cooperates with the same to maintain a fluid-tight seal.

A further object of the invention is to provide an improved construction of connector means whereby a detachable ring associated with one of the pipe members is easily aligned with the bolt holes in the fixed connector of the connecting pipe, so that the pipes can be easily and quickly connected in a fluid-tight manner.

A further object of the invention is to provide an improved construction for couplers of the type described constructed of a minimum of parts so that the same may be easily and cheaply fabricated, yet capable of standing long and hard usage without becoming broken or out of order.

A further object of the invention is to provide in combination with the improved connector means described, a flexible gasket or collar so positioned with respect to the other elements that a limited amount of annular alignment of the pipe sections may be obtained.

Other objects and advantages will be more apparent from the following description wherein reference is had to the accompanying two sheets of drawings, upon which Fig. 1 is a side elevational view of our improved coupling member showing a pair of pipe sections connected thereby;

Fig. 2 is a longitudinal sectional view through the same, taken generally on the lines 2—2 of Fig. 1;

Fig. 3 is a cross-sectional view through the connector elements and the pipe sections taken generally on the line 3—3 of Fig. 2;

Fig. 4 is a similar cross-sectional view taken on the line 4—4 looking in the opposite direction;

Fig. 5 is a full size fragmentary view of a portion of the pipe sections and connector members shown in a detached position, and Fig. 6 is a similar fragmentary view of the connector member associated with the male pipe section showing a slightly modified form of construction.

In the embodiment of the invention which we have chosen to illustrate, in Figs. 1 and 2 we have shown a pair of pipe sections 10 and 12 of any suitable or desirable length, the section 10 being connected by welding or otherwise to a male extension 14 having the turned in end 16 and the section 12 having the bell end 18, as shown. The pipes 10 and 12, while they may be formed of any desirable material such as cast iron, wrought iron, sheet metal or plastic, are preferably shown as a comparatively thin sheet metal piping that is formed from flat metal shaped about a mandrel with the edges sealed together. The pipe 12, as shown, may have an outwardly tapered or bell portion 18 with the metal bent back upon itself, and having a portion 20 cylindrical in shape with an outwardly turned lip 22. A cylindrical disc 24 provided with a plurality of openings 26 may be loosely fitted about the pipe 12, the pipe passing through the axial opening 28 therein.

The extension 14 of the pipe 10 may have a dished cylindrical gasket retaining member 30 positioned on the same and secured as by welding, shown at W, to the outer wall of the pipe extension 14. The member 30 may have a cylindrical flange 32 extending parallel to the disc 24 and may also have a plurality of bolt holes 34 therein which are aligned with the bolt holes 26 in the disc 24. The member 30 as fastened to the member 14, thus provides a circular pocket 36 within which a generally V-shaped gasket or collar 38 is seated.

The gasket member 38 may be formed with two annular diverging lip portions 40 and 42 which extend from a thickened apex portion 44. The lip 50 may fit snugly against the inner face of the member 30 and the lip 42, which is of a tapered or conical form, may extend inwardly and tightly hug the extended end 14 of the pipe section 10.

When the pipe sections are assembled together as shown in Figs. 1 and 2, the belled mouth 18 of the pipe 12 fits snugly over the lip 42. Bolt members 50 are then passed through the aligned openings 26 and 34, and as the nuts 52 are tightened thereon, the belled mouth will be drawn tightly over the lip 42 of the gasket, deforming the same as it is tightly pressed between the member 14 and the belled mouth 18 of the pipe 12. As thus assembled, the joint is completely fluid-tight, and water may be drawn through the pipe in the direction shown by the arrows, without leakage at the joint.

This condition will hold true even though the pipe sections 10 and 12 may be slightly disaligned, as shown by the dotted lines in Fig. 2, as for example where the pipe 10 is lying on a horizontal support and the pipe 12 is supported at a slight incline. In this condition the bolt members 50 adjacent the top of the pipes would be fastened tighter than those at the bottom, which condition is permissable, due to the fact that the disc 24 is loosely fitted on the pipe 12.

In order to provide for more flexibility than may be obtaining by having only the disc 24 loosely mounted on the pipe, we have shown a modified form of the invention in Fig. 6, in which the member 30 is loosely held on the section 14 against an outwardly pressed ridge 14a formed in the section 14. This construction will permit some angular movement of the member 30 on the section 14, as well as the angular movement of the member 24 on the section 12. Since the gasket 38 is pressed tightly against the outer surface of the section 14, even though the pipes may be disposed at a slight angle, the seal is fluid-tight in the angular position.

While we have illustrated and described a specific embodiment of the invention, it will be apparent to those skilled in the art that changes and modifications may be made in the exact details shown, and we do not wish to limit ourselves in any particular; rather what we desire to secure and protect by Letters Patent of the United States is:

1. The combination with a flexible pipe coupling which includes a male pipe member having an inwardly tapering end, a female pipe member adapted to receive said inwardly tapered end and having an outwardly belled mouth, a shoulder on said female pipe member adjacent said mouth, a disc member loosely secured on said female pipe member against said shoulder and a fixed dished cylindrical gasket retaining member secured on said male pipe member adjacent its end, a V-shaped gasket positioned therein and bolt members adapted to connect said disc and said gasket retaining member with the belled mouth of said female pipe member extending into said V-shaped gasket compressing a portion of said gasket against the outer wall of said male member to create a fluid-tight seal therebetween.

2. The combination with a flexible pipe coupling which includes a male pipe member having an inwardly tapering end, a female pipe member adapted to receive said inwardly tapered end and having an outwardly belled mouth, a shoulder on said female pipe member adjacent said mouth, a disc member secured on said female pipe member against said shoulder and a cylindrical gasket retaining member secured on said male pipe member adjacent its end, a V-shaped gasket positioned therein and bolt members adapted to connect said disc and said gasket retaining member with the belled mouth of said female pipe member extending into said V-shaped gasket compressing a portion of said gasket against the outer wall of said male member to create a fluid-tight seal therebetween.

3. The combination with a flexible pipe coupling which includes a male pipe member having an inwardly tapering end, a female pipe member adapted to receive said inwardly tapered end and having an outwardly belled mouth, a shoulder on said female pipe member adjacent said mouth, a disc member loosely secured on said female pipe member against said shoulder and a loosely mounted dished cylindrical gasket retaining member on said male pipe member adjacent its end, a V-shaped gasket positioned therein and bolt members adapted to connect said disc and said gasket retaining member with said belled mouth of said female pipe member extending into said V-shaped gasket compressing a portion of said gasket against the outer wall of said male member to create a fluid-tight seal therebetween.

4. The combination with a flexible pipe coupling which includes a male pipe member having an inwardly tapering end, a female pipe member adapted to receive said inwardly tapered end and having an outwardly belled mouth, a shoulder on said female pipe member adjacent said mouth, a disc member loosely secured on said female pipe member against said shoulder and a fixed dished cylindrical gasket retaining member secured on said male pipe member adjacent its end, a gasket positioned therein and bolt members adapted to connect said disc and said gasket retaining member with the belled mouth of said female pipe member extending into said V-shaped gasket compressing a portion of said gasket against the outer wall of said male member to create a fluid-tight seal therebetween.

5. The combination with a flexible pipe coupling which includes a male pipe member having an inwardly tapering end, a female pipe member adapted to telescopically receive the inwardly tapered end of said male pipe member and having an outwardly belled mouth, a shoulder on said female pipe member adjacent said mouth, a disc member loosely mounted on said female pipe member against said shoulder and a fixed dished cylindrical gasket retaining member secured on said male pipe member adjacent its end, a V-shaped gasket positioned therein and bolt members adapted to connect said disc and said gasket retaining member with the belled mouth of said female pipe member extending into said V-shaped gasket and compressing a portion of said gasket against the outer wall of said male member to create a fluid-tight seal therebetween.

GEORGE F. HAUF.
ERNEST PRETORIUS.